(12) United States Patent
Van Wiemeersch et al.

(10) Patent No.: US 11,024,139 B1
(45) Date of Patent: Jun. 1, 2021

(54) CAPACITIVE SENSOR SYSTEM FOR CARGO BED CAP TAMPERING DETECTION

(71) Applicant: Ford Global Technologies, LLC, Dearborn, MI (US)

(72) Inventors: John Robert Van Wiemeersch, Novi, MI (US); Stuart C. Salter, White Lake, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/738,764

(22) Filed: Jan. 9, 2020

(51) Int. Cl.
*B60R 25/30* (2013.01)
*G08B 13/26* (2006.01)
(Continued)

(52) U.S. Cl.
CPC .......... *G08B 13/26* (2013.01); *B60R 25/1004* (2013.01); *B60R 25/31* (2013.01);
(Continued)

(58) Field of Classification Search
CPC .......... A61B 2562/0219; A61B 5/6891; A61B 5/0006; A61B 5/0008; A61B 5/0013; A61B 5/002; A61B 5/0022; A61B 5/0077; A61B 5/01; A61B 5/02055; A61B 5/0261; A61B 5/0402; A61B 5/0476; A61B 5/0488; A61B 5/053; A61B 5/1112; A61B 5/1116; A61B 5/1117; A61B 5/1118; A61B 5/6803; A61B 5/6806; A61B 5/6807; A61B 5/681; A61B 5/6824; A61B 5/6826; A61B 5/7264; A61B 7/00; A61B 7/04; A61B 7/045; A61B 8/00; A61B 8/06; A61B 8/0808; A61B 8/488; A61B 8/565; A61B 1/00006; A61B 1/00045; A61B 1/04; A61B 2017/00199; A61B 2034/258; A61B 34/25; A61B 50/13; A61B 50/20; A61B 50/22; A61B 50/24;
(Continued)

(56) References Cited

U.S. PATENT DOCUMENTS 6,073,069 A * 6/2000 Kim ...................... B23Q 15/22
701/50
9,033,116 B2 5/2015 Breed
(Continued)

FOREIGN PATENT DOCUMENTS

CN 204055720 U 12/2014

*Primary Examiner* — Daniel Previl
(74) *Attorney, Agent, or Firm* — Frank Lollo; Eversheds Sutherland (US) LLP

(57) ABSTRACT

The disclosure is directed to a vehicle cargo bed capacitive sensor system configured to determine when a cargo bed cap installed on the cargo bed (e.g., the bed of a pickup truck) changes position or is being manipulated in some way. The system may include one or more capacitive sensors disposed on one or more cargo bed walls, between the cargo cap and the cargo bed. The system detects when the cargo bed cap is removed, and detects when particular cargo bed doors are opened using the sensors. The system may also provide a control system that allows users to authorize individuals to access particular areas, group individual bins together for access control, and can provide information when the system detects unauthorized access.

19 Claims, 8 Drawing Sheets

(51) Int. Cl.
  *B60R 25/34* (2013.01)
  *B60R 25/10* (2013.01)
  *G08B 13/08* (2006.01)
  *B60R 25/31* (2013.01)

(52) U.S. Cl.
  CPC .............. *B60R 25/34* (2013.01); *G08B 13/08* (2013.01); *B60R 2325/205* (2013.01)

(58) Field of Classification Search
  CPC ......... A61B 50/33; A61B 5/0002; A61B 5/11; A61B 90/50; G06F 19/00; G06F 3/014; G06F 3/016; G06F 3/017; G06F 9/451; G06F 9/4881; G08B 21/02; G08B 21/0423; G08B 21/0446; G08B 21/0453; G08B 21/0461; G08B 21/0476; G08B 21/0484; G08B 21/0492; G08B 25/016; G08B 21/023; G08B 21/22; G08B 23/00; G16H 15/00; G16H 20/13; G16H 20/30; G16H 40/67; G16H 50/20; G16H 80/00; G16H 20/10; G16H 40/63; G16H 50/70; G16Z 99/00; H04M 2250/12; H04M 3/5116; H04W 84/18; A23L 2/54; A23V 2002/00; A61K 33/00; A61L 2/0094; A61L 2/22; A61L 9/14; A61L 2202/14; A61L 2202/16; A61L 2202/25; A61L 2/10; A61L 2/24; A61M 16/10; A61M 16/101; A61M 2205/8206; A61M 2205/8237; A61M 2205/8262; A61M 2205/8293; A61M 2209/086; A61M 35/30; B01D 2253/108; B01D 2253/116; B01D 2256/12; B01D 2257/102; B01D 2257/40; B01D 2259/4533; B01D 2259/4541; B01D 53/0446; B01D 53/047; B01D 53/0473; B01D 53/053; C02F 1/78; C02F 2303/04; F17D 3/01; Y10T 137/0318; Y10T 307/625; B60R 3/02; B60R 16/0315; B81B 2201/0235; B81B 2201/033; B81B 2203/0307; B81B 2203/056; B81B 3/001; B81B 3/0051; B81B 3/0062; B81B 3/0072; G01P 15/0888; G01P 15/125; G01P 15/18; G01P 2015/0871; G01P 2015/0874; B26B 19/3853; B26B 19/28; B26B 19/286; B26B 19/38; B26B 19/3873; B26B 19/3886; B60J 7/1607; B60J 7/062; B60J 7/141; B60J 7/198; A43B 13/183; A43B 13/184; A43B 3/0005; B21D 26/12; B66B 13/26; C03B 23/065; D06F 2103/10; D06F 58/30; D06F 58/38; E05B 79/10; E05F 15/40; E05F 15/41; E05F 15/60; E05F 15/622; E05Y 2201/434; E05Y 2201/686; E05Y 2201/696; E05Y 2400/36; E05Y 2400/44; E05Y 2400/52; E05Y 2400/56; E05Y 2400/612; E05Y 2400/85; E05Y 2900/516; E05Y 2900/53; E05Y 2900/544; G06N 20/00; G06N 3/006; G06N 7/005; H01H 15/102; H01J 9/385; H01J 9/46; H01L 41/1136; H01R 13/26; H01R 13/64; H01R 2103/00; H01R 24/68; H02J 5/00; H02J 7/02; H02N 2/18; H04B 1/385; H04Q 2209/25; H04Q 2209/886; H04Q 9/00; Y10S 30/01
  USPC ....... 340/426.24, 431, 438, 448, 426.3, 463, 340/467, 539.23, 545.3, 562, 566, 571, 340/691.6
  See application file for complete search history.

(56) References Cited

U.S. PATENT DOCUMENTS

| | | | |
|---|---|---|---|
| 9,884,627 B1 | 2/2018 | Gage et al. | |
| 2010/0314182 A1* | 12/2010 | Crain | B60L 58/21 180/60 |
| 2011/0042990 A1* | 2/2011 | Holt | B60P 7/0815 296/37.6 |
| 2012/0217216 A1* | 8/2012 | Owens | B60P 1/5423 212/277 |
| 2015/0047133 A1* | 2/2015 | Sveum | B65G 69/2882 14/71.5 |
| 2015/0266382 A1* | 9/2015 | Penmetsa | B60L 1/003 307/10.1 |
| 2016/0101810 A1* | 4/2016 | Xu | G01B 21/22 701/41 |
| 2016/0171859 A1* | 6/2016 | Bowlus | G08B 21/02 340/457 |
| 2016/0236606 A1* | 8/2016 | Schwartz | B60P 1/045 |
| 2017/0106865 A1* | 4/2017 | Lavoie | B62D 15/027 |
| 2017/0193438 A1* | 7/2017 | Jones | G06K 17/0022 |
| 2017/0247053 A1* | 8/2017 | Lavoie | B62D 1/04 |
| 2019/0279494 A1* | 9/2019 | Raasch | G06Q 50/28 |
| 2020/0130485 A1* | 4/2020 | Ireland | B60J 7/062 |

* cited by examiner

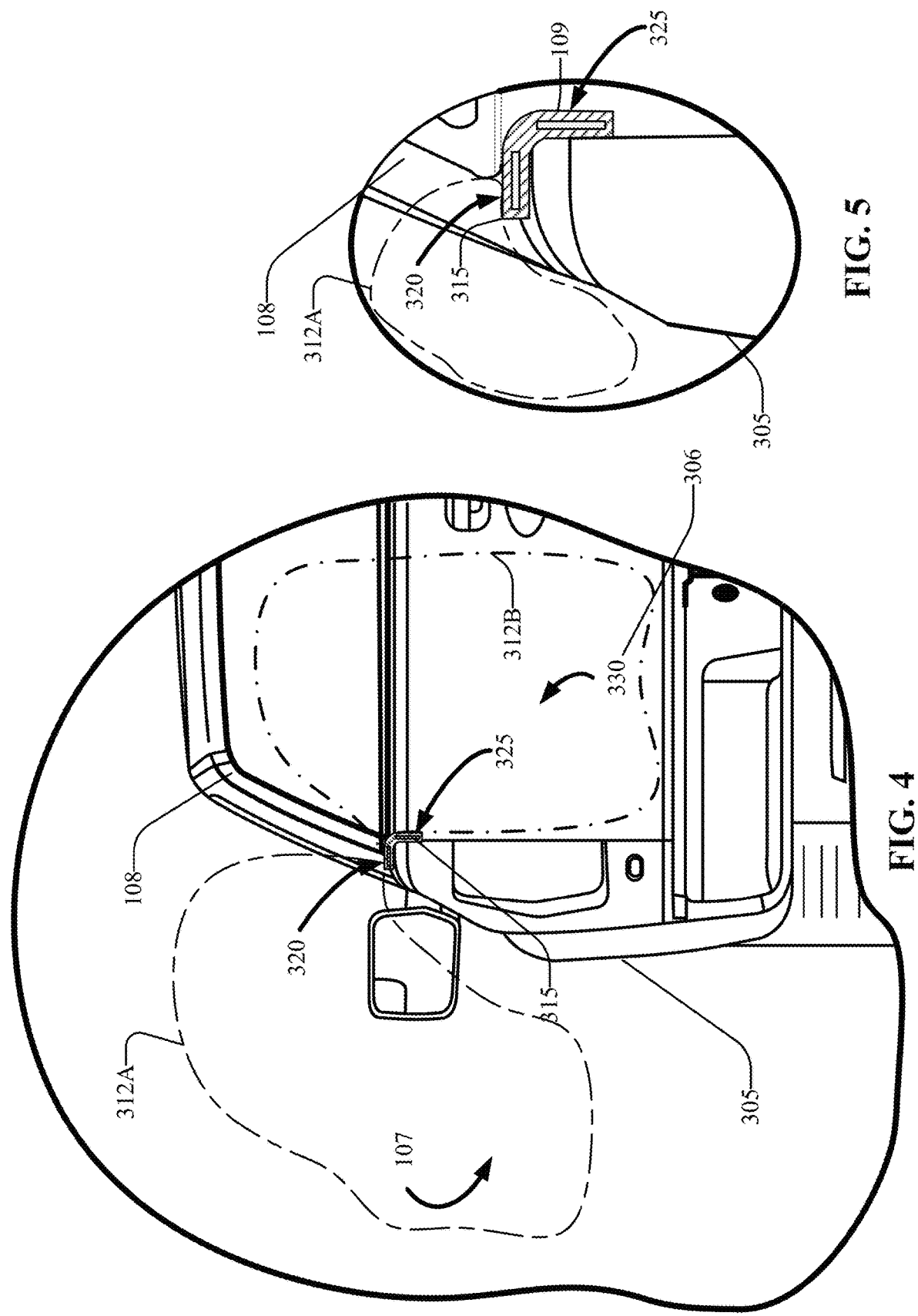

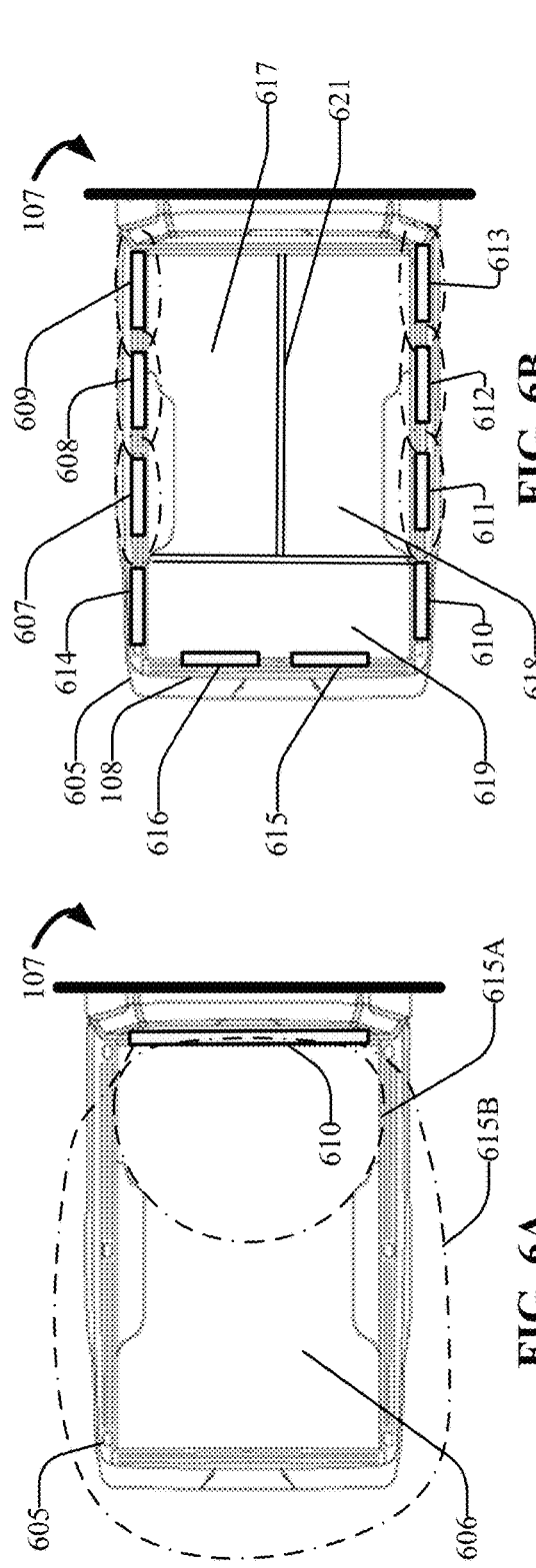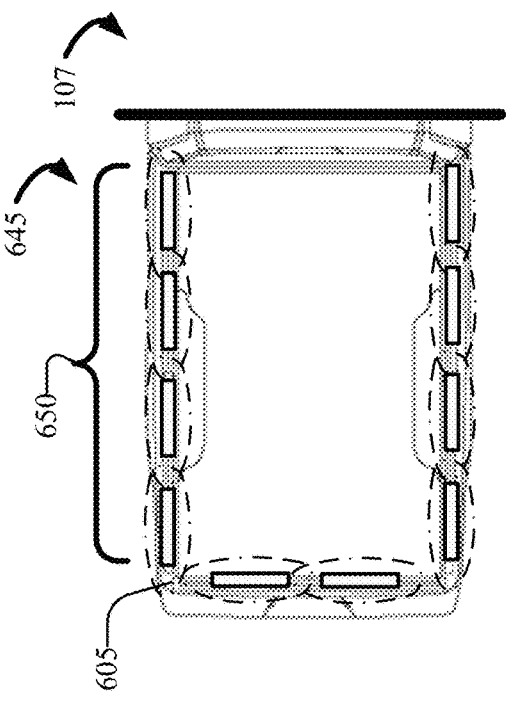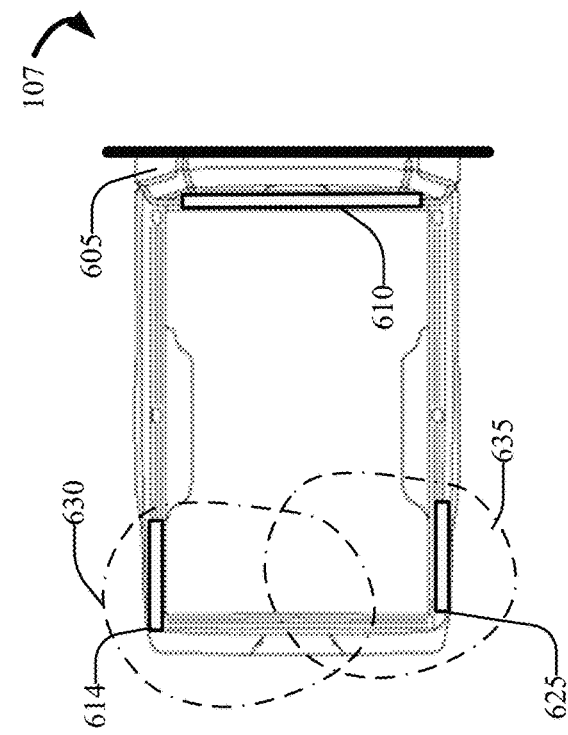

SECTION VIEW A

CAPACITIVE SENSOR SYSTEM FOR CARGO BED CAP TAMPERING DETECTION

TECHNICAL FIELD

The present disclosure relates to capacitive proximity sensor systems for automotive cargo beds.

BACKGROUND

Vehicles with an open cargo bed area, such as pickup trucks, are often used to carry cargo in the cargo bed.

Capacitive proximity sensing for vehicles is disclosed in W.O. Patent Pub. No. 2018099738 (hereafter "the '738 publication"), assigned to Lumileds Holding B.V., which discloses a vehicle monitoring apparatus that includes capacitive proximity sensors used to determine whether an object is touching the vehicle. The '738 publication does not provide features that allow configuration of user-selectable capacitive sensors to detect unauthorized access within portions of the cargo bed cap or lockboxes associated within the cargo bed of the vehicle. In other aspects, conventional systems such as the system described in the '738 publication further do not include sensing capability that can indicate when individual cargo bins of the cargo bed cap are opened, or provide a control system for grouping bins together to provide access control to particular users.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 is an enlarged partial port (left) side view of the vehicle of FIG. 3 depicted with the cargo bed cap disposed on a surface configured with a capacitive sensor in accordance with the present disclosure.

FIG. 5 is a partial section view of FIG. 3, with the cargo bed cap disposed on a cargo bed surface having the port-side capacitive sensor, in accordance with the present disclosure.

FIGS. 6A-6D depict various configurations of capacitive proximity sensors in a cargo bed of a vehicle in accordance with the present disclosure.

DETAILED DESCRIPTION

Overview

Figure 1:
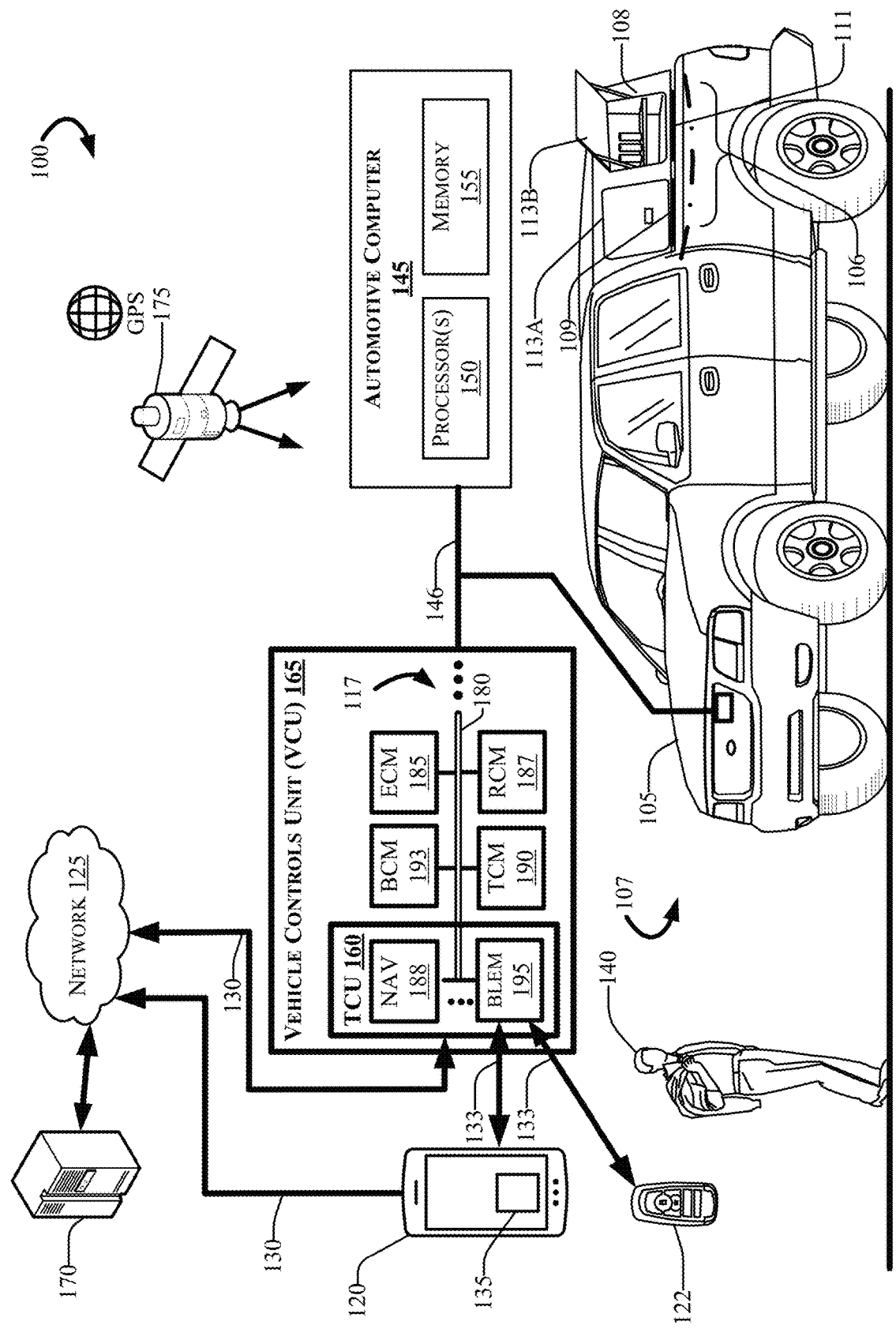
FIG. 1 depicts an example computing environment in which techniques and structures for providing the systems and methods disclosed herein may be implemented.

The systems and methods disclosed herein describe a vehicle cargo bed cap containing interior portions within that is configured with a capacitive proximity sensor system. The capacitive proximity sensor system may be utilized to determine when a cargo bed cap installed on the cargo bed (e.g., the bed of a pickup truck) changes position or is being manipulated in some way. The system may include one or more capacitive sensors disposed on one or more cargo bed walls, between the cargo cap and the cargo bed. The system detects when the cargo bed cap has been removed, and also detects when particular cargo bed doors within the cargo bed cap have been opened, using the sensors. The system may also provide a control system that allows users to authorize individuals to access particular areas disposed within the cargo bed cap, group individual bins together for access control, and can provide information to the user when the system detects unauthorized access.

The system may include one or more capacitive sensors disposed on the top and side surfaces of one or more cargo bed walls. The system detects shifting cargo and items exiting the cargo bed or particular areas disposed within the cargo bed cap (e.g., by falling or bouncing out of the cargo bed or individual portions within the cargo bed cap) by measuring changes in electrostatic fields associated with the capacitive proximity sensors. The system may also detect a person approaching the cargo bed/cargo bed cap of the vehicle and/or detect an individual opening a cargo bin door, or accessing another interior portion of the cargo bed cap, such as reaching into the cargo bed through the cargo bed cap door.

The system may further include a control system interface by way of an app for control of the capacitive sensor system. A user may add or remove access to individuals, group particular bins together for access control, and set limits on an amount of time that cargo bin doors may remain open without triggering an alert. The mobile device may also receive system alerts when authorized access is detected, and perform other vehicle control functions via control messages sent to the automotive computer responsive to user input.

Aspects of the present disclosure can detect potential theft and loss of valuable cargo from a vehicle cargo bed using a low-current sensor system that remains continuously active, and detects unauthorized access to the cargo bed cap and cargo bed storage bins. Use of the disclosed system can mitigate loss of valuable items from a vehicle cargo bed cap cover by providing actionable information that may be usable to identify the source and/or location of the cargo loss, and provide access control to individual users.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts an example computing environment 100 that can include a vehicle 105, an automotive computer 145, a Vehicle Controls Unit (VCU) 165 disposed in connection with the automotive computer 145 by way of a power bus 146, and a mobile device 120. The mobile device 120 may be communicatively coupled with the vehicle 105 via one or more network(s) 125, and via one or more direct connection (s) which may communicate via one or more wireless channel(s) 130, via the network(s) 125, and/or via wireless channel(s) 133 that connect the mobile device 120 to the vehicle 105 directly via the VCU 165.

The mobile device 120 may include one or more application 135. The mobile device 120 generally includes a memory (not shown in FIG. 1) for storing program instructions associated with an application 135 that, when executed by a mobile device processor (not shown in FIG. 1), performs aspects of disclosed embodiments. The application (or "app") 135 may be part of the capacitive sensor system 107, or may provide information to the Capacitive sensor system 107 and/or receive information from the capacitive sensor system 107.

Figure 2:
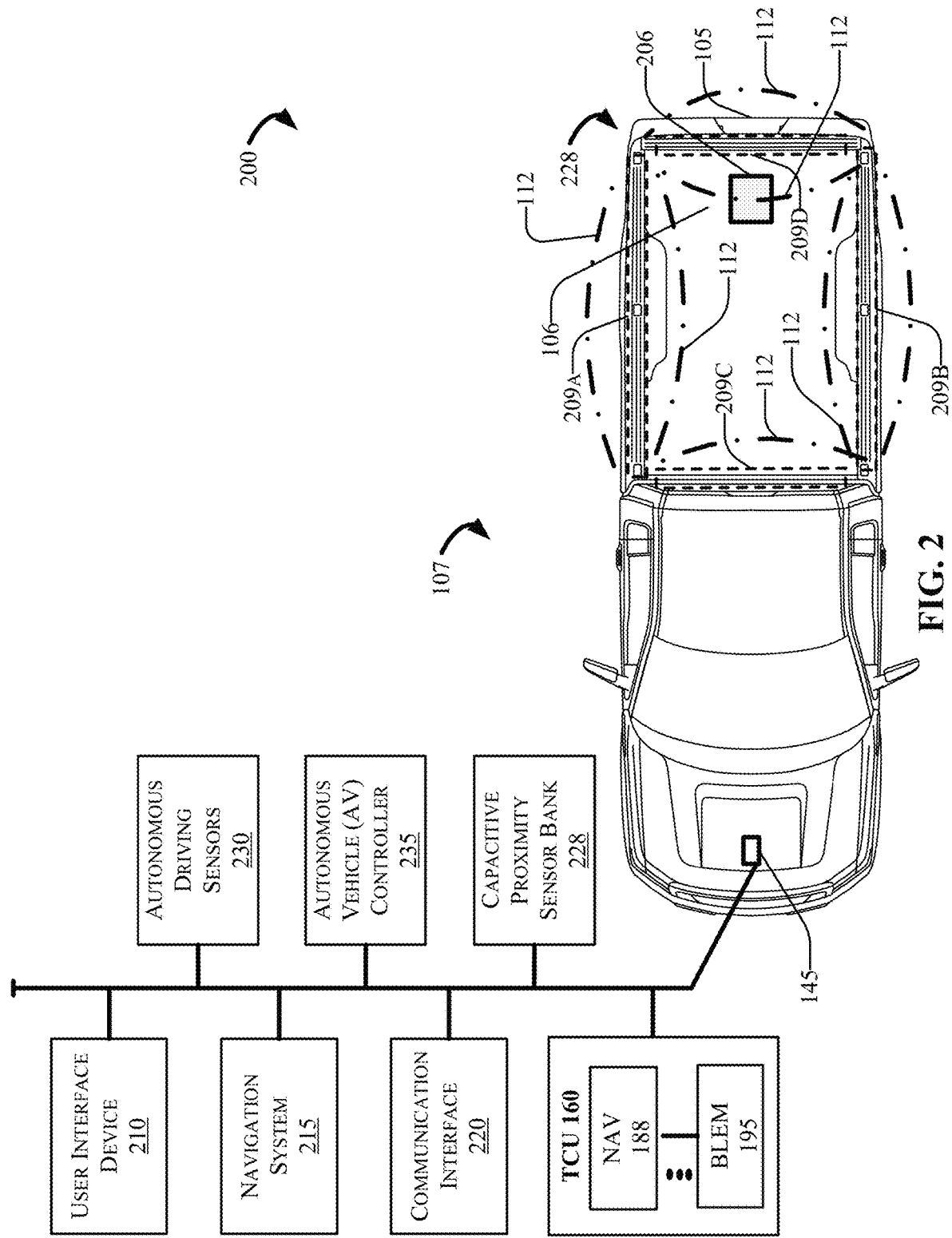
FIG. 2 depicts a functional schematic of an example control system for use in an autonomous vehicle in accordance with the present disclosure.

Embodiments of the present disclosure provide a capacitive sensor system 107 for monitoring position of a cargo bay cap 108 disposed on a cargo bed 106 of the vehicle 105 using one or more capacitive fields 112 as shown in FIG. 2.

The automotive computer 145, may include one or more processor(s) 150 and memory 155. The VCU 165 may be disposed in communication with and/or be a part of the automotive computer 145. The VCU 165 may be disposed in communication with the mobile device 120 via the wireless channel(s) 130 and/or 133, with one or more server(s) 170 via the wireless channel(s) 130, and/or with a key fob 122 via the wireless channel(s) 133. The server(s) 170 may be associated with and/or include a Telematics Service Delivery Network (SDN), and may provide vehicle control access to the user 140, the key fob 122, and/or the mobile device 120 (which may, in some embodiments, also be enabled as and/or include a PEPS vehicle key). The vehicle 105 may also receive and/or be in communication with a Global Positioning System (GPS) 175.

Embodiments of the present disclosure provide a capacitive sensor system 107 for monitoring position of cargo in a cargo bed 106 of the vehicle 105 using one or more capacitive fields 112. Although illustrated as a sport utility, the vehicle 105 may take the form of another passenger or commercial automobile such as, for example, a car, a truck, a sport utility, a crossover vehicle, a van, a minivan, a taxi, a bus, etc., and may be configured to include various types of automotive drive systems.

Exemplary drive systems can include internal combustion engine (ICE) powertrains having a gasoline, diesel, or natural gas-powered combustion engine with conventional drive components such as, a transmission, a drive shaft, a differential, etc. In another configuration, the vehicle 105 may configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level 1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level 4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level 5 autonomy is associated with autonomous vehicle systems that require no human input for operation, and generally do not include human operational driving controls.

The capacitive proximity sensor 111 shown in FIG. 1 is depicted on a top surface of the cargo bed 106 of the vehicle 105. It should be appreciated that the capacitive proximity sensor 111 may be rigidly disposed on any surface of the vehicle 105. Moreover, although depicted as a plurality of capacitive sensors, the capacitive proximity sensor 111 may embody a single sensor, or may include a plurality of capacitive sensors that work in conjunction with one another as part of a capacitive sensor bank.

Two example capacitive proximity sensors 109 and 111 as shown in FIG. 1 are depicted on a top surface of the cargo bed 106 of the vehicle 105. It should be appreciated that the capacitive proximity sensor 111 may be rigidly disposed on any surface of the vehicle 105. Moreover, although depicted as a plurality of capacitive sensors, the capacitive proximity sensor 111 may embody a single sensor, or may include a plurality of capacitive sensors that work in conjunction with one another as part of a capacitive sensor bank. The capacitive proximity sensor 111 as depicted in FIG. 1 is disposed between the cargo bed 106 and the cargo bed cap 108, such that the cargo bed cap 108 touches a top surface of the capacitive proximity sensor 111.

According to an example embodiment, capacitive sensor system 107 may communicate with the mobile device 120 via the one or more wireless channel(s) 130. The mobile device 120 includes one or more application(s) 135 (hereafter the application 135"), which may be controllable by a user 140 as described in various embodiments. For example, the user 140 may control the application 135 operating on the mobile device 120 to continually monitor items stowed in the cargo bed 106 of the vehicle 105 (items not shown in FIG. 1), to receive images and/or video feed of the cargo bed 106 of the vehicle 105, receive information and information prompts, and provide user feedback and control settings associated with the capacitive sensor system 107, and receive cargo alerts generated by the system 107 that indicate a position change of an object in the cargo bed 106. A position change may be, for example, a shift in position of the cargo, and/or may indicate that an item has fallen out or has been taken by someone reaching into the cargo bed 106.

The cargo bed cap 108 can include one or more individual cargo bins such as, for example, a cargo bin 113A (shown as closed) and a cargo bin 113B (shown as open). A position change may also be, for example, an individual opening the cargo bin 113B door, a person reaching into a cargo bin 113B, a person reaching into another door opening of the cargo bed cap (other opening not shown in FIG. 1), and/or may provide an indication that an item has fallen out or has been taken by someone reaching into the cargo bed 106/cargo bed cap 108.

In some aspects, the mobile device 120 may communicate with the vehicle 105 through the one or more channel(s) 130, which may be encrypted and established between the mobile device 120 and the TCU 160. The mobile device 120 may communicate with the TCU 160 using a wireless transmitter that can include, for example, the Bluetooth® Low-Energy (BLE) Module (BLEM) 195. The transmitter may communicate with the mobile device 120 using a wireless communication network such as, for example, the one or more network(s) 125, and also via direct communication with the vehicle 105 using one or more encrypted or non-encrypted connection(s) 133.

The network(s) 125 and wireless channel(s) 130 and 133 illustrate one example communication infrastructure in which the connected devices discussed in various embodiments of this disclosure may communicate. In some aspects, the mobile device 120 may communicate with the vehicle 105 through the one or more wireless channel(s) 130 and/or 133, which may be encrypted and established between the mobile device 120 and a Telematics Control Unit (TCU) 160 that may be operative as part of the VCU 165. The mobile device 120 may communicate with the VCU 165 using the TCU 160, which can include, for example, the BLEM 195. The BLEM 195 may communicate with the mobile device 120 using a wireless communication network such as, for example, the one or more network(s) 125, and/or via the wireless channel(s) 133 that directly connect the vehicle 105 to enabled devices.

The network(s) 125 may be and/or include the Internet, a private network, public network or other configuration that operates using any one or more known communication protocols such as, for example, transmission control protocol/Internet protocol (TCP/IP), Wi-Fi (based on the Institute of Electrical and Electronics Engineers (IEEE) standard 802.11), Ultra-Wide Band (UWB), and/or cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The wireless channel(s) 130 and/or 133 may include data connectivity using various low-energy protocols including, for example, Bluetooth®, BLE, or Near Field Communication (NFC) protocols.

The automotive computer 145 may be installed in an engine compartment of the vehicle 105 (or elsewhere in the vehicle 105) and operate as a functional part of the capacitive sensor system 107, in accordance with the disclosure. The automotive computer 145 may include one or more processor(s) 150 and a computer-readable memory 155.

The one or more processor(s) 150 may be disposed in communication with one or more memory devices (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In one example embodiment, the memory 155 may store information such as, for example, particular vehicle states that can indicate that someone has intruded on the vehicle 105. Such intrusions are described hereafter as a cargo bed intrusion state. The system 107 may evaluate information received from the sensor 111, including, for example, a static field (also referred to herein as "a capacitive field") associated with the cargo based on the change of the capacitive field associated with the cargo bed 106. The memory 155 may store information in the form of a lookup table or other database, which may include the cargo bed intrusion state indicative that a person or object has crossed a cargo wall threshold associated with the cargo bed 106 of the vehicle 105. In some aspects, the processor(s) 150 may generate the cargo alert based on the cargo bed intrusion state.

The VCU 165 may coordinate the data between vehicle 105 systems (e.g., the ECUs 117), connected servers (e.g., the server(s) 170), the automotive computer 145, and other vehicles (not shown in FIG. 1) operating as part of a vehicle fleet (not shown in FIG. 1). The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the application 135 operating on the mobile device 120, from one or more instruction sets received from the capacitive sensor system 107, and/or from instructions received from an autonomous vehicle (AV) controller such as an AV controller 235 discussed with respect to FIG. 2.

The TCU 160 can be configured to provide vehicle connectivity to wireless computing systems onboard and offboard the vehicle 105, and may include a Navigation (NAV) receiver 188 for receiving and processing a GPS signal from the GPS 175, the BLEM 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120, and/or one or more keys (which may include, for example, the key fob 122).

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the Capacitive sensor system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance.

The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. In an example embodiment, the ECUs 117 may control aspects of vehicle operation and communication using inputs from human drivers, inputs from an autonomous vehicle controller, the capacitive sensor system 107, and/or via wireless signal inputs received via the wireless channel(s) 133 from other connected devices such as the mobile device 120, among others. The ECUs 117, when configured as CAN nodes in the bus 180, may include a central processing unit (CPU), a CAN controller, and/or a transceiver (not shown in FIG. 1). For example, although the mobile device 120 is depicted in FIG. 1 as connecting to the vehicle 105 via the BLEM 195, it is contemplated and that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The central BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193. The capacitive proximity sensor 111 may be one sensor of a capacitive proximity sensor bank. One example of such a sensor bank is depicted in FIG. 2 as a capacitive proximity sensor bank 228.

In an example embodiment of the present disclosure, the BCM 193 is disposed in communication with the capacitive proximity sensor bank 228, and configured to access one or more of the ECUs 117 and provide information to the automotive computer 145 as part of disclosed computing logic described herein. For example, the automotive computer 145 may work in conjunction with the BCM 193 (and with other ECUs 117) to determine vehicle drive states, select capacitive field sample rates, determine changes in the capacitive field associated with the cargo bed 106 of the vehicle 105, and determine positional changes of cargo in the cargo bed. The ECUs 117 described with respect to the VCU 165 are provided for exemplary purposes only, and are not intended to be limiting or exclusive. Control and/or communication with other control modules not shown in FIG. 1 is possible, and such control is contemplated.

In one example embodiment, the memory 155 may store information such as, for example, storing particular vehicle states that can indicate that someone has made an unauthorized intrusion into the vehicle 105. Such intrusions are described hereafter as a cargo bed/cargo bed cap intrusion state. The system 107 may evaluate information received from the capacitive proximity sensor 111, including, for example, a static field (also referred to herein as "a capacitive field") associated with the cargo based on the change of the capacitive field associated with the cargo bed 106/cargo bed cap 108. The memory 155 may store information in the form of a lookup table or other database, which may include the cargo bed intrusion state indicative that a person or object has crossed a cargo wall threshold associated with the cargo bed 106/cargo bed cap 108 of the vehicle 105. In some aspects, the processor(s) 150 may generate the alert based on the cargo bed intrusion state.

With respect to the computing architecture of the memory module(s), the memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc. The memory 155 may be one example of a non-transitory computer-readable medium, and may be used to store programs in code and/or to store data for performing various operations in accordance with the disclosure.

FIG. 2 illustrates an example functional schematic of a control system 200 that may be configured for use in the vehicle 105. In the example embodiment depicted in FIG. 2, the vehicle 105 is configured as an autonomous vehicle (AV). Regardless of the level of autonomy, the control system 200 can include a user interface 210, a navigation system 215, a communication interface 220, the TCU 160, a capacitive proximity sensor bank 228. When the vehicle 105 is configured as an AV (as depicted in the example embodiment of FIG. 2) the control system 200 may further include one or more autonomous driving sensors 230, and an autonomous mode controller 235.

The user interface 210 may be configured or programmed to present information to a user such as, for example, the user 140 depicted with respect to FIG. 1, during operation of the vehicle 105. Example information may be an alert that indicates that cargo has shifted position in the cargo bed 106 of the vehicle 105. Moreover, the user interface 210 may be configured or programmed to receive user inputs, and thus, it may be disposed in or on the vehicle 105 such that it is viewable and may be interacted with by a passenger or operator. For example, in one embodiment where the vehicle 105 is a passenger vehicle, the user interface 210 may be located in the passenger compartment (or cab) of the vehicle 105. In one possible approach, the user interface 210 may include a touch-sensitive display screen (not shown in FIG. 2).

In some aspects, it is advantageous for a user of the vehicle 105 to know if there is activity at the cargo bed 106 when the vehicle 105 is parked or stopped at an intersection. For example, when the vehicle 105 is parked or stopped at an intersection, the vehicle 105 may be vulnerable to theft or tampering with items in the cargo bed 106, and/or stored in one or more of the cargo storage bins 113A, 113B as shown in FIG. 1, and/or stored within an interior of the cargo bed cap 108 (as depicted in FIG. 1, but not shown in FIG. 2 for clarity). If the vehicle 105 is unoccupied by the user 140 at the time of the theft or loss, it is advantageous to have additional information that may be used to mitigate such loss, such as an indication of a location at which the cargo 206 was lost, or an image of the individual responsible for taking the cargo 206. In another example, it is advantageous to provide an alert indicating that a position of the cargo bed cap 108 and/or the cargo bins 113A, 113B has changed. For example, if an individual has opened a cargo bin 113B door without having proper access that grants them permission to open the door, aspects of the present disclosure can provide an alert based on that position change.

Figure 9:
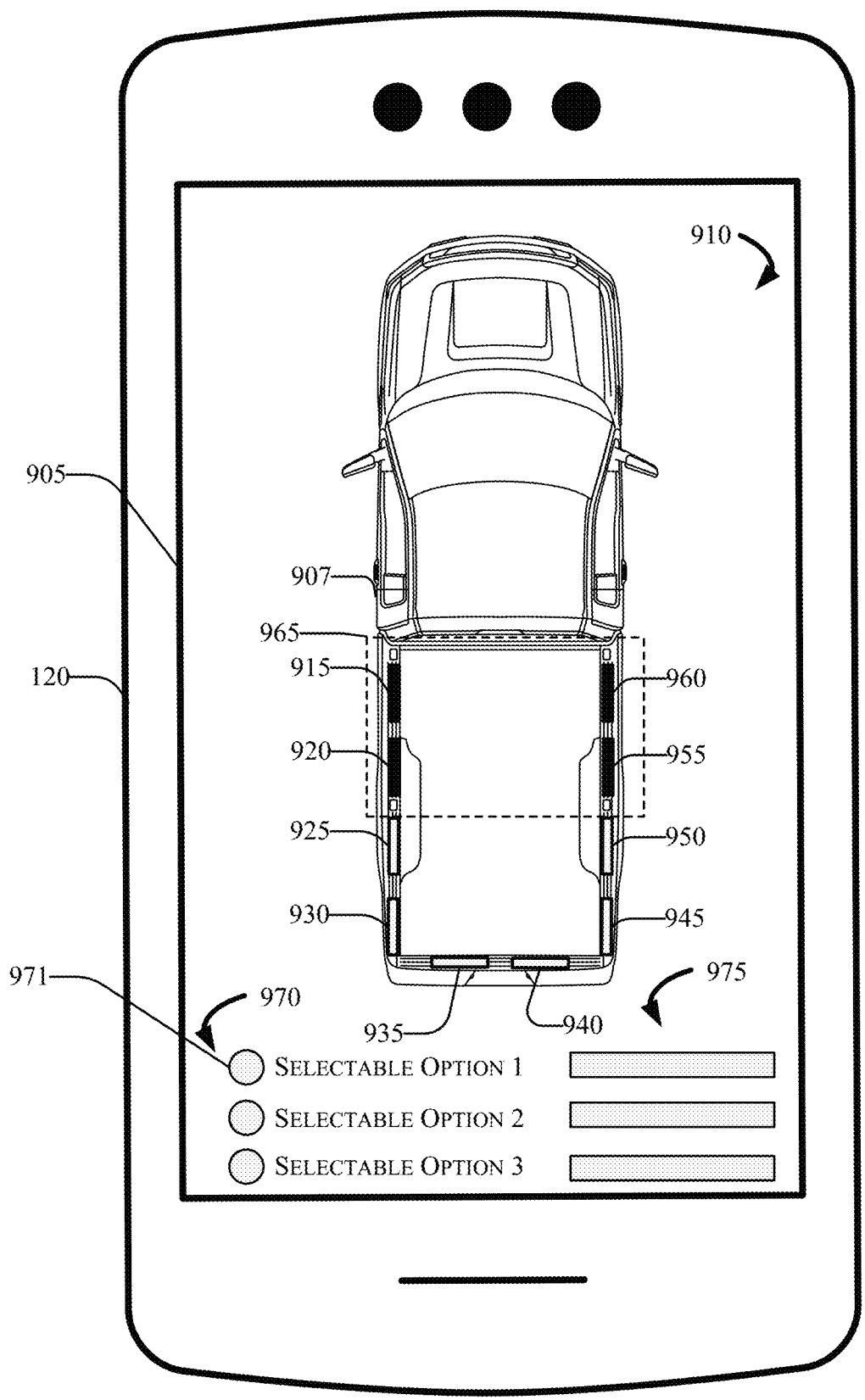
FIG. 9 illustrates a computing device and user interface for operating the capacitive sensor system of FIG. 3 in accordance with the present disclosure.

Accordingly, in one example embodiment, the system 107 may provide, via the user interface 210, a display layout of sensors associated with a cargo bed cap 108. FIG. 9, discussed hereafter, provides one example of such a display layout. In one aspect, the mobile device 120 may receive a selection of a cargo bin door, where a user selects one or more icons that represent the cargo bin doors 113A and/or 113B. A user may input a selection of the doors, sensors, and other aspects, and provide data indicative of a name associated with the cargo bin door such that the cargo bin has a custom name in the application, and that custom name is displayed on the interface. The mobile device can be configured to receive a user identification indicative of an individual. In one example, the user 140 may indicate a name, a mobile device 120 identification (number or Bluetooth® ID), and/or a key fob identifier associated with the individual, and assign one or more of the cargo bins 113A and 113B, etc., to that user for authorized user access. The mobile device 120 may update, in a computer memory, a database of authorized users (not shown in FIG. 1) associated with the cargo bin(s) 113A and 113B.

In another example embodiment, the system 107 may store an activity log (not shown in FIG. 2) in the memory (e.g., memory 155 as shown in FIG. 1) that indicates locations traveled by the vehicle, time information, stop information, time stopped at a respective location, recorded photos and/or video feed associated with particular times, locations, and triggering events, etc. The database of authorized users may be included as part of the activity log, or may be a separate database item stored in the memory.

In another aspect, it may be advantageous to provide an indication of a classification of the cargo 206 (e.g., the object in the cargo bed 106). A classification may be descriptive information such as, for example, a work tool, a package, a box, a piece of furniture, etc. Accordingly, in the event that the cargo bed 106/cargo bed cap 108 is holding a variety of items, the system 107 may identify a classification of each item, and provide the classification of the item as part of the activity log information. In one aspect, the item classification(s) may be associated with one or more areas of the cargo bed cap 108.

The capacitive sensor system 107 may provide location information associated with change of position of the cargo 206. Accordingly, the navigation system 215 may be configured and/or programmed to determine a position of the vehicle 105 in conjunction with one or more triggering events that indicate a change of position of the cargo 206. The navigation system 215 may include a Global Positioning System (GPS) receiver configured or programmed to triangulate the position of the vehicle 105 relative to satellites or terrestrial based transmitter towers. The navigation system 215, therefore, may be configured or programmed for wireless communication. The navigation system 215 may be further configured or programmed to develop routes from a current location to a selected destination, as well as display a map and present driving directions to the selected destination via, e.g., the user interface device 210. In some instances, the navigation system 215 may develop the route according to a user preference. Examples of user preferences may include maximization of fuel/battery usage, reducing travel time, travelling the shortest distance, and/or the like. In other aspects, the navigation system 215 may develop the route according to an instruction from the capacitive sensor system 107, such as, for example, an instruction to navigate to a last known geographic point at which the cargo 206 was lost or taken from the cargo bed 106.

The communication interface 220 may be configured or programmed to facilitate wired and/or wireless communication between the components of the vehicle 105 and other devices, such as a remote server (the server(s) 170 as shown in FIG. 1), or another vehicle (not shown in FIG. 2) when using a vehicle-to-vehicle communication protocol. The communication interface 220 may also be configured and/or programmed to communicate directly from the vehicle 105 to the mobile device 120 (as shown in FIG. 1) using any number of communication protocols such as Bluetooth®, Bluetooth® BLE, Wi-Fi, or UWB.

The TCU 160 may include wireless transmission and communication hardware that may be disposed in communication with one or more transceivers associated with telecommunications towers and other wireless telecommunications infrastructure. For example, the TCU 160 may be configured and/or programmed to receive messages from, and transmit messages to one or more cellular towers (not shown in FIG. 2) associated with a telecommunication provider, and/or and a Telematics Service Delivery Network (SDN) associated with the vehicle 105 (such as, for example, the server(s) 170 depicted with respect to FIG. 1). In some examples, the SDN may establish communication with a mobile device (e.g., the mobile device 120 depicted with respect to FIG. 1) operable by the user 140, which may be and/or include a cell phone, a tablet computer, a laptop computer, a key fob, or any other electronic device. An internet connected device such as a PC, Laptop, Notebook, or Wi-Fi connected mobile device, or another computing device may establish cellular communications with TCU 160 through the SDN.

The communication interface 220 may also communicate using one or more vehicle-to-vehicle communications technologies. An example of a vehicle-to-vehicle communication protocol may include, for example, a dedicated short-range communication (DSRC) protocol. Accordingly, the communication interface 220 may be configured or programmed to receive messages from and/or transmit messages to a remote server (e.g., the server(s) 170 depicted with respect to FIG. 1) and/or other autonomous, semi-autonomous, or manually-driven vehicles (not shown in FIG. 2).

The autonomous driving sensors 230 may include any number of devices configured or programmed to generate signals that help navigate the vehicle 105 while the vehicle 105 is operating in the autonomous (e.g., driverless) mode. Examples of autonomous driving sensors 230 may include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like. The autonomous driving sensors 230 may help the vehicle 105 "see" the roadway and the vehicle surroundings and/or negotiate various obstacles while the vehicle is operating in the autonomous mode.

The autonomous mode controller 235 may be configured or programmed to control one or more vehicle subsystems while the vehicle is operating in the autonomous mode. Examples of subsystems that may be controlled by the autonomous mode controller 235 may include one or more systems for controlling braking, ignition, steering, acceleration, transmission control, and/or other control mechanisms. The autonomous mode controller 235 may control the subsystems based, at least in part, on signals generated by the autonomous driving sensors 230.

The automotive computer 145 may be further disposed in communication with the capacitive proximity sensor bank 228 (hereafter "sensor bank 228"), which may include one or more capacitive proximity sensors. For example, as shown in the example embodiment of FIG. 2, the sensor bank 228 is shown with a plurality of sensors that include a capacitive proximity sensor 209A on the starboard side of the vehicle 105, a capacitive proximity sensor 209B on the port side of the vehicle 105, a capacitive proximity sensor 209C near the cab of the vehicle 105, and a capacitive proximity sensor 209D disposed on a cargo bed gate of the vehicle 105.

It is contemplated that the system 107 may include one or more of the sensors 209A-209D, and may ideally include more than 4. For example, it has been observed that a greater number of capacitive sensors in the sensor bank 228 can result in a finer detail in the detectability of cargo 206 movement in the cargo bed 106/cargo bed cap 108, and may provide access control to particular areas of the cargo bay cap 108, such as, for example, to the cargo bin door 113A but not the door of the cargo bin 113B, or vice versa. Stated in another way, although the system 107 may include a single capacitive sensor, and in embodiments where the number of capacitive sensors is greater than one, the ability to detect fine changes in the capacitive field 112 may increase. In some aspects, the reliability and accuracy of relative measurements with respect to distances of the movement, trajectory of the movement, and other changing positional information may increase with respect to the number of sensing elements in the system 107.

Figure 3:
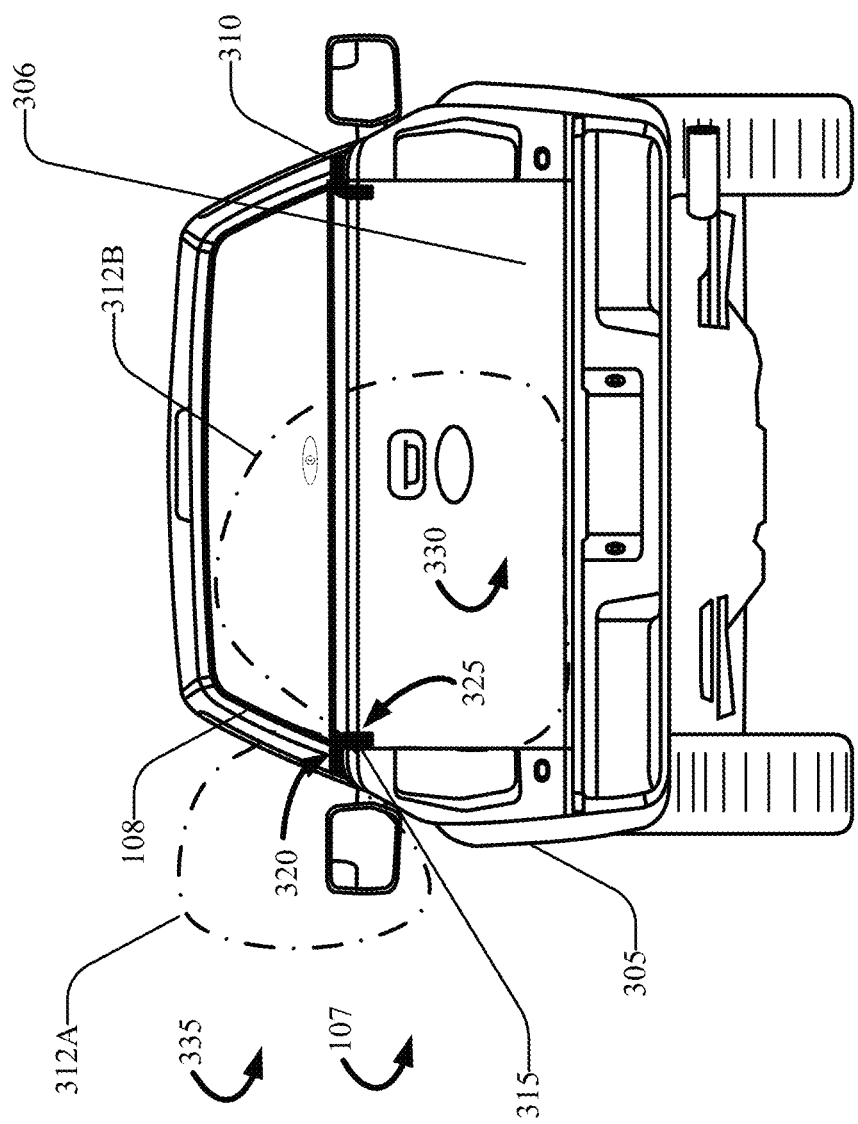
FIG. 3 is a rear view of a vehicle configured with a capacitive sensor system in accordance with the present disclosure.

FIG. 3 is a rear view of a vehicle 305 configured with a capacitive sensor system 107, in accordance with the present disclosure. The vehicle 305 may be substantially similar or identical to the vehicle 105 and/or the vehicle 105. For example, the vehicle 305 includes a cargo bed 306, and a cargo bed cap 108 installed on the cargo bed 106. The system 107 is shown in FIG. 3 with a port-side capacitive sensor 315 and a starboard-side capacitive sensor 310 disposed on a top surface of the cargo bay walls of the vehicle 305. As shown in FIG. 3, the cargo bed cap 108 is installed such that it rests on or proximate to a top-facing capacitive sensor surface 320. Accordingly, the capacitive field 312A may change based on an object or people proximate the port-side capacitive sensor 315.

The port-side capacitive sensor 315 is depicted with two capacitive fields 312A and 312B. The capacitive field 312A is depicted extending from the top-facing capacitive sensor surface 320 of the port-side capacitive sensor 315. The capacitive field 312B is shown extending to an interior portion 330 of the cargo bed 306 and/or the cargo bed cap 108, from the interior-facing capacitive sensor surface 325.

For clarity, the capacitive fields 312A and 312B are depicted in FIG. 3. The capacitive fields 312A and 312B may be attenuated and/or otherwise shaped by the sheet metal associated with the cargo bed 306, as well as any objects placed in the cargo bed 306 such as the cargo bed cap 108, and/or cargo inside the cargo bed cap 108 (cargo not shown in FIG. 3). It should be appreciated that each active sensor in the system 107 (e.g., the starboard-side capacitive sensor 310) may also selectively project a capacitive field (not shown in FIG. 3) when user-enabled in the capacitive sensor system 107.

FIG. 4 depicts an enlarged partial port-side view of the vehicle of FIG. 3, with the cargo bed cap 108 disposed on the top-facing capacitive sensor surface 320 of the port-side capacitive sensor 315. The port-side capacitive sensor 315, which may be typical of some or all sensors described according to embodiments of the present disclosure is positioned between the cargo bed cap 108 and the cargo bed 106 of the vehicle 305, such that the capacitive field 312A can detect intrusion into a particular cargo storage bin (not shown in FIG. 4) proximate to the port-side capacitive sensor 315.

The vehicle 305 may further include a cargo bed lamp (not shown in FIG. 4), and a cargo bed camera system (not shown in FIG. 4). In some example embodiments, the system 107 may determine an intrusion state that indicates that cargo has shifted position with respect to the cargo bed 306 and/or the cargo bed cap 108 (either by moving or shifting position in the cargo bed 306, by being ejected from the vehicle cargo bed 306 while the vehicle 305 is in operation, or by being taken from the cargo bed 306 and/or the cargo bed cap 108). Other triggers are contemplated as well, such as an unauthorized individual (not shown in FIG. 4) approaching the vehicle 305 within an active zone for a PEPS system associated with the vehicle 305 (which may be determined by the key fob 122, the mobile device 120, or via another authentication method).

FIG. 5 is a partial section view of the vehicle 305, with the cargo bed cap 108 disposed on a cargo bed 106 surface having the port-side capacitive sensor 315, in accordance with the present disclosure. In one example embodiment, the cargo bed cap 108 may be removably fastened and touching the top-facing capacitive sensor surface 320 such that the capacitive field 312A extends outside of the vehicle 305. The capacitive field 312B (not shown in FIG. 5) extends to the interior portion 330 (depicted in FIG. 4) from the interior-facing capacitive sensor surface 325.

It should be noted that the capacitive fields 312A and 312B are exemplary only, and may not depict literal shapes of the fields discussed herein. In another example of a triggering event, an individual may reach into the cargo bed 306 by reaching into the cargo bed interior portion 330 (e.g., through an open cargo bed cap door), by reaching into a cargo bin 113 (as shown in FIG. 1), by opening a cargo bin door 113A and/or 113B, or other physical manipulation of the cargo bed cap 108. Reaching into the cargo bed cap 108, opening a cargo bin door (e.g., 113 as shown in FIG. 1), or another manipulation of the cargo bed cap 108, may result in disruption (or a change) in the capacitive field(s) 312A and/or 312B. The change of the capacitive field(s) 312A and 312B may indicate an unauthorized access. In another aspect, the system 107 may determine, based on the capacitive field(s) 312A and 312B, that a position change of the cargo 206 in the cargo bed 106 and/or cargo bed cap 108 is imminent or has occurred.

Responsive to an indication of the cargo bed intrusion state, an image sensor associated with the cargo bed camera system (not shown in FIG. 4 or 5) may transmit an image of the cargo bed 306 and/or the cargo bed cap 108 to the automotive computer 145 (as shown in FIG. 1). In another aspect, the automotive computer 145 may determine a value of ambient light (which may indicate that it is too dark to obtain a quality image or video feed), activate the cargo bed lamp responsive to determining that the ambient light is below a defined threshold value, and trigger the image sensor to obtain the image of the cargo bed 306 and/or the cargo bed cap 108 using the cargo bed camera system while activating the cargo bed lamp to illuminate the cargo bed 306, interior portion 330, exterior portion 335, or another area of the cargo bed cap 108.

As briefly explained above, the configuration of the capacitive sensors in the capacitive sensor system 107 may include at least one to any greater number of capacitive sensors. For example, FIGS. 6A-6D depict various configurations of capacitive proximity sensors in a cargo bed 606 of an example vehicle 605, in accordance with the present disclosure. As shown in FIG. 6A, the system 107 may include a single capacitive sensor 610. The system 107 may generate the capacitive field 615A using a first input voltage, and a capacitive field 615B is generated using a second input voltage that is greater than the first input voltage. Therefore, the respective size of a capacitive field (e.g., 615A, 615B) may be proportional to the input voltage associated with the respective capacitive sensor. By increasing the input voltage sensitivity (depicted as the capacitive field 615B), a single capacitive sensor 610 may be used to detect movement in the cargo bed 606. Accordingly, the processor(s) 150 (shown in FIG. 1) may determine that a change of the capacitive field 615B associated with the cargo bed 606 of the vehicle 605 indicates that an object (not shown in FIG. 6A) in the cargo bed capacitive field 615B has changed its position with respect to the cargo bed 606.

In another aspect, a single capacitive sensor 610 may also detect that a position of the cargo bed cap has changed. For example, if the cargo bed cap 108 is removed from the vehicle 605, the system 107 may determine the change of position of the cap, and issue an alert.

According to embodiments described herein, the system 107 may be disposed on the vehicle 105, vehicle 105, vehicle 305, 605, etc. having a plurality of sensors that can be selectively activated individually or as groups. By providing access to groups of sensors (and thus, the storage bins associated with particular sensors in the group), an individual may be granted or denied access to some areas of the vehicle and excluded from other areas. As shown in FIG. 6B, the system 107 is depicted with a plurality of capacitive sensors that include capacitive proximity sensors 607, 608, 609, 610, 611, 612, 613, 614, 615, and 616. In an example embodiment, the capacitive proximity sensors 607-616 may be user-selectable to form groups associated with particular areas of the cargo bed cap 108 which are associated with capacitive fields 630 and 635 as depicted in FIG. 6C. Since tonneau covers (e.g., the cargo bed cap 108) may be configured in any number of ways, a group of sensors can be enabled to react in unison, such as the sensors 607, 608, and 609. The cargo bed cap 108 is depicted having three storage bin areas 617, 618, and 619, formed by the dividing walls 621. Accordingly, the system 107 may receive user input to selectively enable a plurality of sensors 607, 608, and 609, while disabling other sensors (e.g., 615 and 616). When particular users are granted access to a storage area, e.g., the storage area 617, that user may have limited access, while excluding others from that access. In other aspects, the disabled storage area 619 may be openly accessible because respective sensors 615 and 616 were selectively disabled.

FIG. 6C depicts the system 107 having two capacitive sensors that include the sensors 614 and 610. The capacitive fields 630 and 635 are shown intersecting one another at various points. Similarly, FIG. 6D depicts a plurality of sensors 650 generating a plurality of capacitive fields 645. It should be appreciated that any number of capacitive sensors may be included in the system 107.

Figures 7, 8:
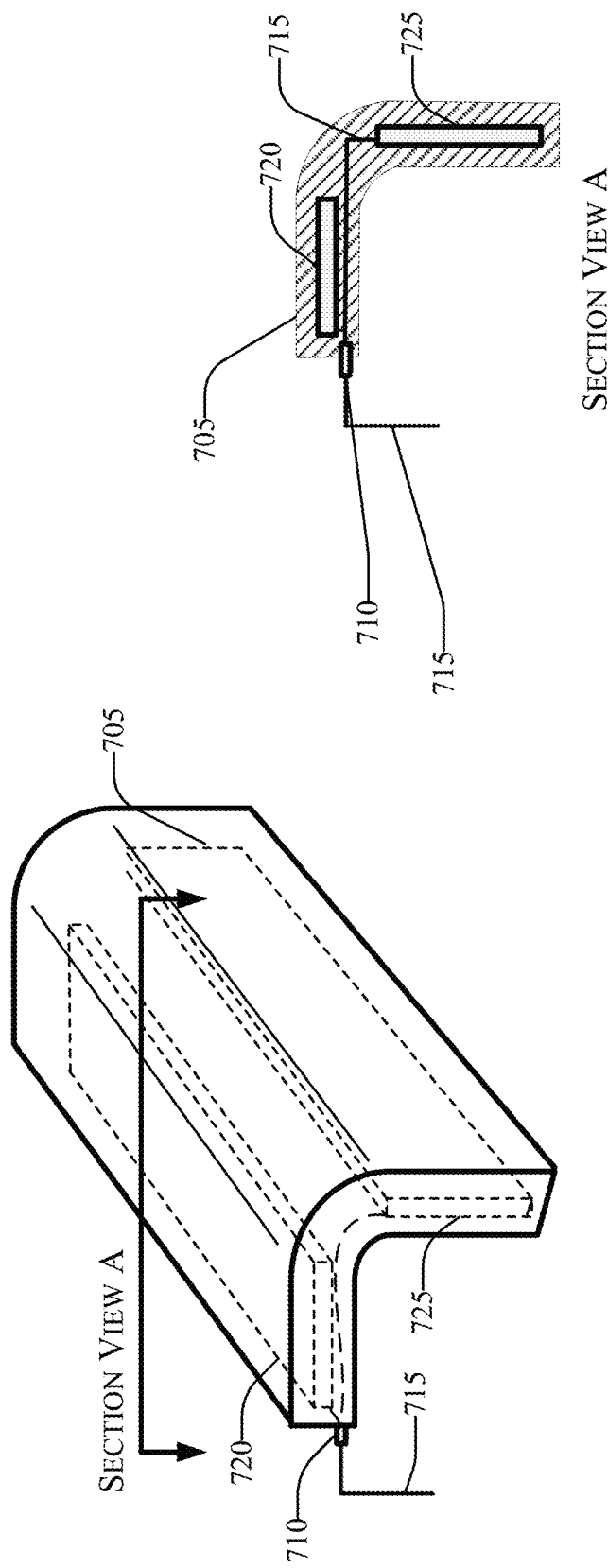
FIGS. 7-8 depict isometric views of an example capacitive proximity sensor in accordance with the present disclosure.

FIG. 7 is an isometric view of an example capacitive proximity sensor 705, in accordance with the present disclosure. The capacitive sensor 705 is one example embodiment for constructing the capacitive proximity sensors disclosed herein. The sensor 705 may include one or more thin film insert sensors 720 and 725, which may be constructed of a thin film substrate (e.g., 15 mil) upon which a silver ink layer (not shown in FIG. 7) may be deposited and electrically connected with a respective data channel 715. The data channel(s) 715 may terminate at a connector 710, which may connect the capacitive sensor 705 to one or more ECUs 117.

The example embodiment variously depicted in FIGS. 7 and 8 depicts two distinct and separate conductive sensors 720 and 725, however it is contemplated that the sensor 705 may be constructed with a single thin film sheet instead of a two-part construction. One benefit of such an embodiment may be simplicity of manufacturing. Further, the sensors may be constructed using conductive paint applied to the trim in sections to create capacitive sensors.

In the embodiment shown in FIGS. 7 and 8 however, by constructing the sensor 705 to include two separately connectible sensors 720 and 725, the system 107 may distinguish between two distinct capacitive fields. For example, the processor(s) 150 may distinguish between an interruption to the capacitive field 312A, generated by the sensor 720, from an interruption to the capacitive field 312B generated by the film insert 725 (where the respective capacitive fields are as shown in FIG. 3).

FIG. 8 depicts a section view A of the example capacitive proximity sensor 705, in accordance with the present disclosure. In one aspect, the sensors 720 and 725 may be insert molded in a two-step manufacturing process such that the connector 710, the data channels 715, and the sensors 720 and 725 are over-molded into a unified sensor. Although generally depicted as "L" shaped, it should be appreciated that the capacitive proximity sensor 705 may take another form or shape, and should not be construed as limiting.

In another aspect, in lieu of over-molding the sensors 720 and 725, the electrodes may be constructed with an electrically active polymer, such as a metal impregnated thermoplastic having electrical connectivity with an insert molded connector 710.

In yet another aspect, it is contemplated that the capacitive sensors 720 and 725 may be adhered to a vehicle surface, such as, for example, on the cargo bay wall pointed toward the cargo bay interior, and on the top surface of the cargo bay wall pointed toward the sky in lieu of providing the film inserts as separate parts from the vehicle body. In such an embodiment, the sensors 720 and 725 may be rigidly disposed on the cargo bay wall surfaces using known fastening means, then over-coated with a protective layer, such as a plasticized bed liner material. Over-coating the sensors 720 and 725 may provide protection from damage and weather conditions, while simplifying manufacturing processes, by providing a unified body integration with the vehicle 105.

Capacitive fields may be adjusted with increasing or decreasing sensitivity, which may be adjustable based on a sensitivity threshold for sensor output. The system 107 is useful for determining unauthorized access to the vehicle cargo bed 306 during operation of the vehicle. Depending on the situation, the sensing field (e.g., the capacitive fields 312A and 312B) can be extended far enough to make it virtually impossible to reach inside the cargo bed 306 without activating a system trigger (e.g., exceeding a threshold value for capacitance, voltage, Fast Fourier Transform (FFT), etc.). This can be done by increasing the drive current to the capacitive sensors.

As with most electronic sensing systems, samples are taken at discrete steps or intervals, recorded in a persistent memory, and analyzed using a computing logic. According to some embodiments of the present disclosure, false positives (e.g., false alarms that incorrectly predict unauthorized access to the cargo bed 306) may be avoided by adjusting a sample rate of the capacitive values from the sensor bank. In one embodiment, the rate for sampling the capacitance may be moderated as a function of vehicle speed, and other factors associated with vehicle use and/or location. For example, it may be advantageous to sample at a relatively higher rate when driving at highway speeds, but sampling can be done slowly when the vehicle is stationary with engine ON and then sampling can be done at the slowest rate when the vehicle is off and parked.

In another aspect, it may be advantageous to desensitize the sensor bank, obtain samples at a slower rate, or shut down one or more of the capacitive sensors responsive to detecting that one or more of the sensors are adjacent to a stationary obstacle such as a wall, where there is limited space between a cargo bay wall and the obstacle that limits the ability for someone to reach into the carbo bay. For example, in one embodiment, the processor(s) 150 may determine a proximity of the vehicle 305 to an adjacent obstacle, and responsive to determining that the vehicle 305 is less than a threshold distance to the obstacle while parked, disengage one or more capacitive sensors of the sensor bank.

In another embodiment, in some situations, it may be advantageous to prevent false alarms by the system 107 that incorrectly indicate unauthorized entry. For example, when the vehicle is in motion, the system 107 may increase the sample rate based on operational factors that can include, for example, a vehicle speed, a proximity of the key fob 122 to the vehicle 305, while the vehicle 305 is in motion, a GPS indication of changing location with respect to time, a GPS indication with respect to a geo-fence, and other event metrics collected by the VCU 165. Other event metrics may include, for example, a GPS location, a turn radius, a braking severity, a rate of acceleration, etc.

In yet another example, the processor(s) 150 may change the sample rate based on a detected cargo size. The cargo size may be determined by one or more piezoelectric signals associated with load in the cargo bed of the vehicle. In another aspect, the cargo size may be determined using the camera system, where the automotive computer 145 determines, from one or more images received from the camera system, a composition of the cargo in the cargo bed, determines a volume of the cargo in the cargo bed, and estimates a cargo mass based on the composition of the cargo in the cargo bed and the volume of the cargo. In an embodiment, the processor(s) 150 may adjust the sample rate based on the estimated cargo mass. For example, if the cargo mass is large, the sample rate may be reduced due to the reduced possibility of rapid cargo shifting with respect to time, vehicle speed, etc.

In another embodiment, it may be advantageous to prevent false alarms by the system 107 that incorrectly indicate unauthorized entry while the vehicle is parked or stopped at a traffic light. For example, when the vehicle is stopped or parked, the sample rate may be decreased. The system 107 may reduce false alarms by determining, in response to a change of capacitive field, that an authorized key fob 122 is proximate the vehicle 305.

FIG. 9 illustrates a computing device, which may be in an embodiment, the mobile device 120, configured for operating the capacitive sensor system 107, in accordance with the present disclosure. The mobile device 120 includes a user interface 905 configured to output a display layout of sensors 910 associated with a cargo bed cap, which may be, for example, the cargo bed cap 108 as discussed in prior figures. The layout of sensors 910 may further include an icon 915 representing a sensor on the vehicle associated with the mobile device 120. The icon 915 may also be associated with a door of a cargo bin, and/or an area of a cargo bed cap that may be compartmentalized with a divider or other barrier. An example of a sensor may be the capacitive proximity sensor 111 depicted in FIG. 1, which may be selectively enabled or disabled to determine human proximity and/or a change of position associated with the cargo bin 113B, for example. The mobile device 120 may output the layout of sensors 910, and receive, by way of a user input, data indicative of a selection of a cargo bin door 915.

In the example of FIG. 9, the layout of sensors 910 may include an image or icon representing a vehicle 907 (e.g., the vehicle 105, 205, 305, 605, etc.). The processor of the mobile device 120 may output the display layout of the plurality of sensors, that may include icons 915, 920, 925, 930, 935, 940, 945, 950, 955, and 960. The capacitive sensors 915-960 may be respectively associated with a plurality of cargo bin doors (e.g., 113A and 113B, as shown in FIG. 1) in the cargo bed cap 108. The mobile device 120 may receive one or more selective inputs of the icon 915 associated with the cargo bin door or other area of the vehicle cargo bed cap.

For example, a user may toggle-select the icons 915, 920, 955, and 960 via a touch select operation, or by dragging a finger to form a circle around the multiple sensors. The selection may include a plurality of cargo bin doors (e.g., a cargo bin door 915, 920, 955, and 960) that form a cargo bin door group 965. A plurality of user-selectable options 970 may also be included, which can provide a single-click combination of sensor combinations. In one aspect, as an example embodiment, the Selectable Option 1 may include one or more selectable radio buttons 971 selectable to enable or disable the cargo bin door group 965. Any combination of options may be configurable by the user and saved in the computer memory associated with the mobile device 120.

In one aspect, the mobile device 120 may be configured to provide a user input prompt for custom naming of particular cargo bin doors and/or selectable options. In some aspects, the mobile device 120 may receive data input, via one or more data input fields 975, indicative of a name or names associated with particular cargo bin door and/or the cargo bin door group 965.

In other aspects, the mobile device 120 may receive a user identification indicative of an individual and a key fob associated with the individual. Accordingly, the mobile device 120 may update a database of authorized users (not shown in FIG. 9), where the database is associated with the cargo bin. The mobile device may also output prompts that allow user input to set time threshold values such as permissible time for doors to remain open without triggering an alarm.

Figure 10:
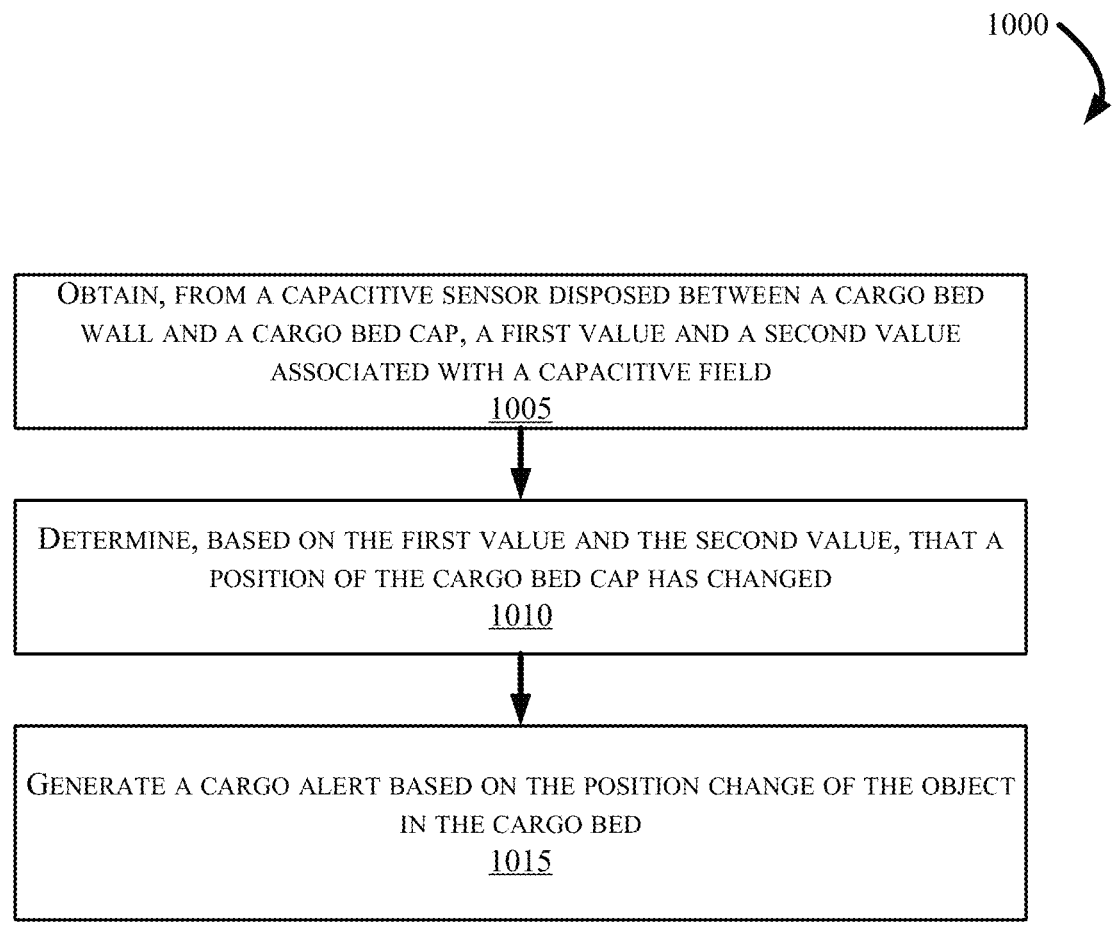
FIG. 10 depicts a flow diagram of an example method for determining cargo bed cap tampering in accordance with the present disclosure.

FIG. 10 is a flow diagram of an example method 1000 for monitoring activity in a cargo bed of a vehicle, according to the present disclosure. More particularly, using the method 1000, the system 107 may monitor activity in a cargo bed cap, and monitor areas adjacent to the cargo bed cap. FIG. 10 may be described with continued reference to prior figures, including FIGS. 1-9. The following process is exemplary and not confined to the steps described hereafter. Moreover, alternative embodiments may include more or less steps than are shown or described herein, and may include these steps in a different order than the order described in the following example embodiments.

Referring first to FIG. 10, at step 1005, the method 1000 may commence by obtaining from a capacitive sensor disposed between a cargo bed wall and a cargo bed cap, a first value and a second value associated with a capacitive field. For example, the method may include the step of receiving the first value from a capacitive sensor bank 228 disposed proximate to the cargo bed 106 of the vehicle 105, where the first value is indicative of a capacitance associated with a capacitive field (e.g., 112A, 112B, etc.). The step may include receiving the second value from the capacitive sensor bank disposed proximate to the cargo bed of the vehicle, where the second value is indicative of the capacitance associated with the capacitive field. The step may further include determining that a difference between the first value and the second value exceeds a threshold, and determining that the position of the cargo bed cap has changed based on the difference between the first value and the second value exceeding the threshold.

Next, the method includes a step 1010 of determining, based on the first value and the second value, that a position of the cargo bed cap has changed. For example, with reference again to FIG. 2, the processor(s) 150 may determine a cargo bed intrusion state by evaluating changes in capacitive fields associated with the capacitive proximity sensor bank 228. For example, determining the change of the capacitive field 112 can include receiving, from the capacitive proximity sensor bank 228 disposed proximate to the cargo bed 106 of the vehicle 105, a first capacitance value for the capacitive field 112. A capacitance value may be, for example, an input voltage or a FFT value associated with the capacitive field 112. Other metrics associated with capacitive sensors are possible, and such metrics are contemplated. The processor(s) 150 may receive, from the capacitive proximity sensor bank 228, a second capacitance value for the capacitive field 112, and determine, based on the first capacitance value and the second capacitance value, that the object 206 in the cargo bed 106 has changed position with respect to the cargo bed 106. Accordingly, the determination is made by comparing the first and the second capacitance values to determine if a threshold change of values has been met.

At step 1015, the method includes a step of generating an alert based on the position change of the cargo bed cap.

Accordingly, the processor(s) 150 may select a capacitive sensor input voltage based on the vehicle drive state, and determine the position change based on the capacitive sensor input voltage. An intrusion state may indicate that an intruder has crossed a vehicle threshold, such as by opening a cargo bin door, by removing the cargo bed cap from the vehicle 105, or by accessing an area of the cargo bed cap. The processor(s) 150 may determine a cargo bed intrusion state based on the change of the capacitive field associated with the cargo bed 106 and/or the cargo bed cap 108. The cargo bed intrusion state may indicate that a person or object has crossed a cargo wall threshold associated with the cargo bed, and/or is proximate to a protected area of the cargo bed cap 108. Accordingly, the processor(s) 150 may generate the alert based on the cargo bed intrusion state.

In another aspect, determining the change of the capacitive field can include determining that the position of the cargo bed cap has changed. That step or series of steps can include determining that the door of the cargo bin has been opened, determining that a key fob is within a threshold of distance from the vehicle responsive to determining that the door of the cargo bin has been opened, and accessing, in the computer memory, a database of authorized users associated with the cargo bin 113 to retrieve a user access record indicative that a user associated with the key fob 122 is authorized to access the cargo bin 113, and generating the alert based on the user access record.

In another embodiment, with reference once again to FIG. 10, the step 1015 of generating the alert may include providing information associated with a particular location at which the intrusion or loss of an item occurred. For example, the processor(s) 150 may determine a geographic location associated with the cargo bed intrusion state, and update an intrusion event log to record the geographic location. The intrusion event log may be stored in the memory 155, on the server(s) 170, or on the mobile device 120 by the application 135. Accordingly, the processor(s) 150 and/or the application 135 may send the alert to the mobile device 120 associated with the vehicle 105, and output the alert using the application 135 on the mobile device 120.

Other triggered events are contemplated for determining the cargo bed intrusion state. For example, responsive to determining that the person or object has crossed a cargo wall threshold or otherwise manipulated a portion of the cargo bed cap 108, the system 107 may determine that the key fob 122 is not within a threshold distance from the vehicle 105. A threshold distance may be 3 meters, 5 meters, 10 meters, in the interior of the vehicle, or another fixed and predetermined distance. The processor(s) 150 may sound an audible alarm responsive to determining that the key fob 122 or a Phone-as-a-Key is not within the predetermined distance from the vehicle, or alternatively, responsive to determining that a key fob is not authorized. An unauthorized key fob may be a key fob that has had authorized access at some time in the past, but such authorization has been revoked by the server(s) 170 and/or the VCU 165. The system 107 may also generate a message to the mobile device 120, and/or to the server(s) 170.

In an embodiment, the user 140 may also provide instructions to the system 107 via the application 135 on the mobile device 120. For example, the user 140 may provide, via the mobile device 120, a message (not shown in FIGS. 1-10) comprising a vehicle control instruction, where the instruction requests a video feed and/or a photo image of the incident that triggered the alert. The processor(s) 150 may receive the response message having the vehicle control instruction, obtain video data and image data from the cargo bed camera system, and save to the memory 155 a video feed of the person or object crossing the cargo wall threshold, responsive to the vehicle control instruction. Other mitigating actions are also contemplated. For example, responsive to the message from the mobile device 120, the VCU 165 may actuate a lock control mechanism, actuate a door closing mechanism, turn on or off cargo bed lights, sound an alarm, activate vehicle flasher lights, disable a motor, navigate the vehicle to a particular location, and/or perform another action.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein.

In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   obtaining, from a capacitive sensor bank disposed between a cargo bed wall and a cargo bed cap of a vehicle, a first value and a second value associated with a capacitive field;
   determining that a difference between the first value and the second value does not meet a target threshold;
   determining that a position of the cargo bed cap has changed based on the difference between the first value and the second value exceeding the threshold; and
   generating an alert based on the position change of the cargo bed cap.

2. The method according to claim 1, further comprising:
   responsive to determining that the position of the cargo bed cap has changed, determining that a vehicle key is within a threshold distance from the vehicle; and
   determining, based on a database of authorized users associated with the capacitive sensor, that a user associated with the vehicle key is authorized to access a cargo bed portion associated with the capacitive sensor.

3. The method according to claim 1, further comprising:
   responsive to determining that the position of the cargo bed cap has changed, determining that a vehicle key is not within a threshold distance from the vehicle;
   sounding an audible alarm; and
   sending an alert to a mobile device associated with the vehicle.

4. The method according to claim 1, wherein the cargo bed cap comprises a cargo bin; and
   determining that the position of the cargo bed cap has changed comprises:
      determining that a door of the cargo bin has been opened;
      determining that a vehicle key is within a threshold distance from the vehicle responsive to determining that the door of the cargo bin has been opened;
      accessing, in a computer memory, a database of authorized users associated with the cargo bin to retrieve a user access record indicative that a user associated with the vehicle key is authorized to access the cargo bin; and
      generating the alert based on the user access record.

5. The method according to claim 4, further comprising:
   determining a length of time that the door of the cargo bin is open; and generating the alert responsive to determining that the length of time that the door of the cargo bin is open exceeds a threshold time value for an open bin door.

6. The method according to claim 5, further comprising:
receiving, from a mobile device associated with the vehicle, a message comprising:
   a setting for the threshold time value for the open bin door;
   an identifier of the vehicle key; and
   information associated with authorization of the vehicle key to access the cargo bin; and
updating the database with the threshold time value for the open bin door, the identifier of the vehicle key, and the information associated with authorization of the vehicle key to access the cargo bin.

7. A system, comprising:
a processor; and
a memory for storing executable instructions, the processor configured to execute the instructions to:
   obtain, from a capacitive sensor disposed on a vehicle between a cargo bed wall and a cargo bed cap, a first value and a second value associated with a capacitive field, wherein the cargo bed cap comprises a cargo bin;
   determine that a door of the cargo bin has been opened;
   determine that a vehicle key is within a threshold distance from the vehicle responsive to determining that the door of the cargo bin has been opened;
   access a database of authorized users stored in a computer memory, the database associated with the cargo bin, to retrieve a user access record indicative that a user associated with the vehicle key is authorized to access the cargo bin; and
   generate the alert based on the user access record.

8. The system according to claim 7, wherein the processor is further configured to execute the instructions to:
   responsive to determining that the position of the cargo bed cap has changed, determine that a vehicle key is within a threshold distance from the vehicle; and
   determine, based on a database of authorized users associated with the capacitive sensor, that a user associated with the vehicle key is authorized to access a cargo bed portion associated with the capacitive sensor.

9. The system according to claim 7, wherein the processor is further configured to execute the instructions to:
   receive the first value from a capacitive sensor bank disposed proximate to the cargo bed of the vehicle, wherein the first value is indicative of a capacitance associated with a capacitive field;
   determine that a difference between the first value and the second value does not meet a target threshold; and
   determine that the position of the cargo bed cap has changed based on the difference between the first value and the second value does not meet a target threshold.

10. The system according to claim 9, wherein the processor is further configured to execute the instructions to:
   responsive to determining that the position of the cargo bed cap has changed, determine that a vehicle key is not within a threshold distance from the vehicle;
   sound an audible alarm; and
   send an alert to a mobile device associated with the vehicle.

11. The system according to claim 7, wherein the processor is further configured to execute the instructions to:
   determine a length of time that the door of the cargo bin is open; and
   generate the alert responsive to determining that the length of time that the door of the cargo bin is open exceeds a threshold time value for an open bin door.

12. A computing device comprising a computer memory storing instructions for operating a capacitive sensor system for a cargo bed cap for a vehicle, and a processor configured to execute the instructions to:
   output a display layout of sensors associated with a cargo bed cap, wherein the layout of the sensors comprises a sensor associated with a cargo bin door;
   receive a selection indicative of the cargo bin door;
   receive data indicative of a name associated with the cargo bin door;
   receive a user identification indicative of an individual and a vehicle key associated with the individual; and
   update, in a computer memory, a database of authorized users associated with the cargo bin.

13. The computing device of claim 12, wherein the processor is further configured to execute the instructions to:
   output the display layout of a plurality of sensors associated with a plurality of cargo bin doors in the cargo bed cap; and
   receive the selection of the cargo bin door, wherein the selection comprises a plurality of cargo bin doors that form a cargo bin door group.

14. The computing device of claim 12, wherein the processor is further configured to execute the instruction to:
   update the database of authorized users associated with the cargo bin, wherein updating the database comprises associating a cargo bin door group with the user identification.

15. The computing device of claim 12, wherein the processor is further configured to execute the instruction to:
   receive information indicative of a user selection for a threshold time value for an open bin door; and
   update the database of authorized users with the information indicative of the threshold time value.

16. The computing device of claim 12, wherein the computing device is a smart phone.

17. The computing device of claim 12, wherein the computing device is a vehicle infotainment interface.

18. The computing device of claim 12, further comprising grouping a plurality of user-selected sensor icons together to form a sensor group, updating the database of authorized users with information indicative of the sensor group.

19. The computing device of claim 12, wherein the cargo bed cap comprises a cargo bin, and wherein the processor is further configured to execute the instructions to:
   determine that a door of the cargo bin has been opened;
   determine that a vehicle key is within a threshold distance from the vehicle responsive to determining that the door of the cargo bin has been opened;
   access the database of authorized users stored in a computer memory, the database associated with the cargo bin, to retrieve a user access record indicative that a user associated with the vehicle key is the individual that is authorized to access the cargo bin; and
   generate the alert based on the user access record.

* * * * *